United States Patent
Ben Abdelaziz

(10) Patent No.: US 9,680,517 B2
(45) Date of Patent: Jun. 13, 2017

(54) OPTIMIZED WIRELESS CHARGING SYSTEM

(71) Applicant: Faurecia Interieur Industrie, Nanterre (FR)

(72) Inventor: Omar Ben Abdelaziz, Beauvais (FR)

(73) Assignee: Faurecia Interieur Industrie, Nanterre (FR)

( * ) Notice: Subject to any disclaimer, the term of this patent is extended or adjusted under 35 U.S.C. 154(b) by 0 days.

(21) Appl. No.: 14/861,319

(22) Filed: Sep. 22, 2015

(65) Prior Publication Data

US 2016/0087668 A1    Mar. 24, 2016

(30) Foreign Application Priority Data

Sep. 22, 2014  (FR) ...................................... 14 58901

(51) Int. Cl.
| | |
|---|---|
| *H04B 5/00* | (2006.01) |
| *H04B 1/3883* | (2015.01) |
| *H02J 7/00* | (2006.01) |
| *H04B 1/3877* | (2015.01) |
| *H04B 1/3888* | (2015.01) |
| *H02J 7/02* | (2016.01) |
| *H02J 50/10* | (2016.01) |

(52) U.S. Cl.
CPC .......... *H04B 1/3883* (2013.01); *H02J 7/0044* (2013.01); *H02J 7/025* (2013.01); *H02J 50/10* (2016.02); *H04B 1/3877* (2013.01); *H04B 1/3888* (2013.01); *H04B 5/0037* (2013.01)

(58) Field of Classification Search
CPC ... H02J 7/0044; H04B 1/3877; H04B 1/3888; H04B 1/3883; H04B 5/0037
See application file for complete search history.

(56) References Cited

U.S. PATENT DOCUMENTS

| | | | |
|---|---|---|---|
| 2011/0285213 A1* | 11/2011 | Kowalewski | H02J 17/00 307/104 |
| 2013/0244735 A1 | 9/2013 | Bury | |
| 2015/0002085 A1* | 1/2015 | Fan | H02J 7/0044 320/108 |
| 2015/0097519 A1* | 4/2015 | Chen | H02J 7/025 320/108 |

OTHER PUBLICATIONS

French Search Report for corresponding application No. 14 58901, dated Apr. 1, 2015, 3 pages, not translated—in French.

\* cited by examiner

*Primary Examiner* — Ping Hsieh
(74) *Attorney, Agent, or Firm* — Reising Ethington P.C.

(57) ABSTRACT

A transmission device that includes a fixed support for receiving an electronic appliance. The transmission device has at least one first and one second retaining elements defining between them a receiving space, the second retaining element being movable with respect to the fixed support along a main direction so as to give the possibility of adapting the size of the receiving space. The transmission device includes a transmission element attached to the retaining elements by a mechanism that includes a first return element connecting the transmission element to the first retaining element and a second return element connecting the transmission element to the second retaining element. The stiffness of the first return element is equal to the stiffness of the second return element.

12 Claims, 1 Drawing Sheet

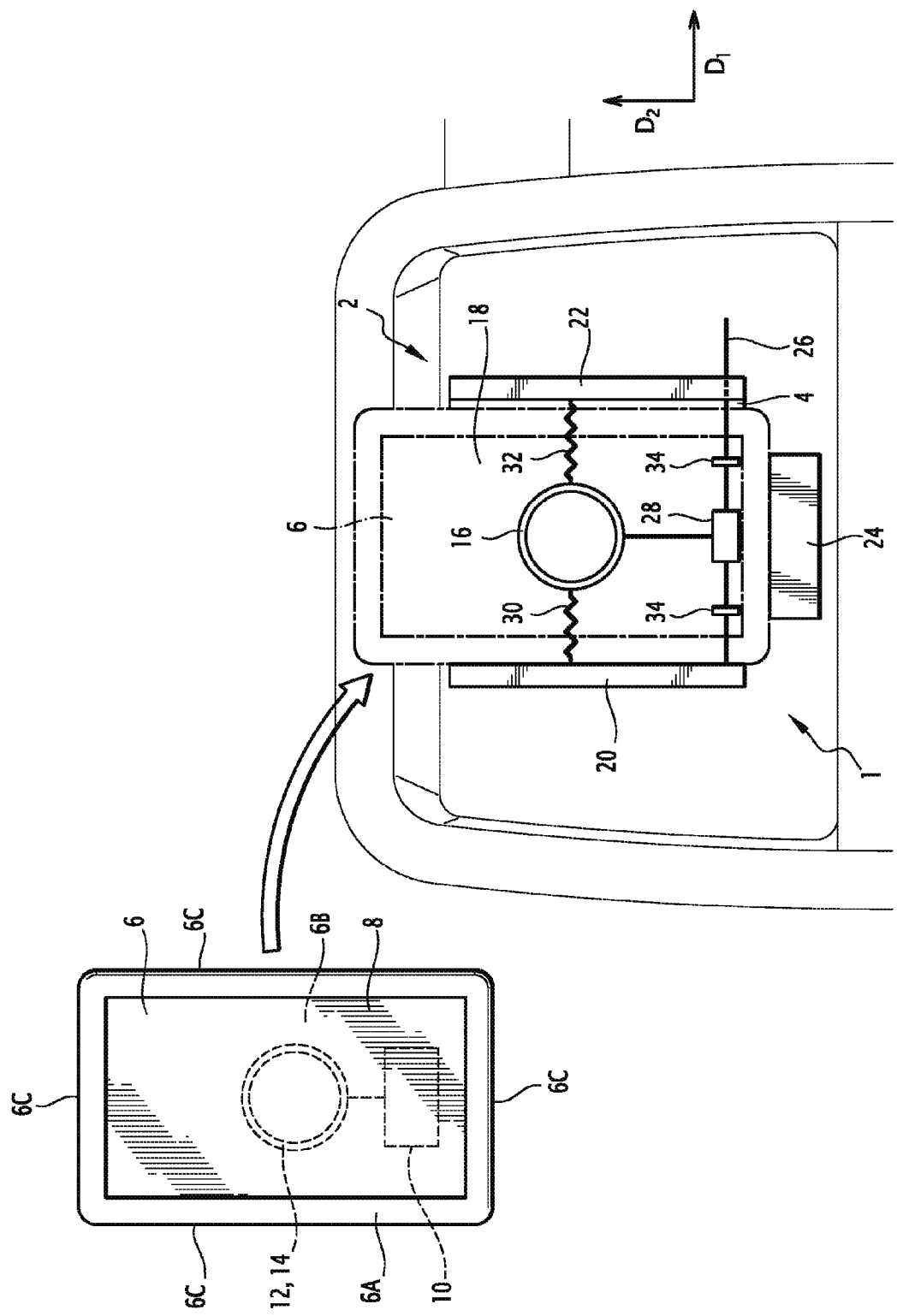

OPTIMIZED WIRELESS CHARGING SYSTEM

TECHNICAL FIELD

The present invention relates to a wireless transmission device for an electronic appliance, of the type comprising a fixed support for receiving an electronic appliance, said fixed support comprising at least one first retainer element and one second retainer element defining between them a space for receiving the electronic appliance, at least the second retainer element being movable relatively to the fixed support along a main direction so as to adapt the size of the receiving space to the electronic appliance received by the support, the transmission device comprising at least one wireless transmission element for transmitting energy and/or pieces of information with the electronic appliance, said transmission element being positioned between the first and second retainer elements and being attached to said retainer elements by a mechanism.

The invention also relates to a piece of equipment for a vehicle interior comprising such a transmission device.

BACKGROUND

In order to facilitate charging and/or communication with a portable electronic appliance, such as a portable telephone or smartphone, it is possible to equip this electronic appliance with a transmission element such as an energy-receiving coil and/or a NFC (near field communication) label or chip, with view to transmitting energy or pieces of information with an additional transmission element provided in a wireless transmission device, such as a wireless charger or a base for communicating with the electronic appliance.

In order to ensure good communication between the transmission element of the electronic appliance and the transmission element of the transmission device, it should be ensured that the transmission elements are actually facing each other and sufficiently close to each other when the electronic appliance is placed on the support of the transmission device. As the transmission element of the electronic appliance is generally substantially positioned at the center of the latter, the transmission element of the transmission device should therefore be placed at the center of the support for ensuring proper alignment of the transmission elements when the electronic appliance is positioned on the support.

However, when the transmission device should be able to receive several types of electronic appliances of different dimensions, the dimensions of the space for receiving the electronic appliance of the support should be adjustable. In this case, it becomes difficult to ensure proper positioning of the transmission element of the transmission device at the center of the receiving space.

SUMMARY

One of the objects of the invention is to propose a wireless transmission device for an electronic appliance comprising a receiving space of variable size while allowing proper centering of the transmission element with which good communication with the electronic appliance may be ensured.

For this purpose, the invention relates to a wireless transmission device of the aforementioned type, wherein the mechanism comprises a first return element connecting the transmission element to the first retaining element and a second return element connecting the transmission element to the second retaining element, the stiffness of the first return element being equal to the stiffness of the second return element so that the transmission element extends at an equal distance from the first and second retaining elements.

By attaching the transmission element to the retaining elements with return elements of same stiffness, it is in ensured that the transmission element will always be at an equal distance from both retaining elements even when the distance between both of these retaining elements is modified. Thus, the transmission element is always positioned at the center of the receiving space of the support, which allows proper alignment of this transmission element with that of the electronic appliance, regardless of the dimension along the main direction of the latter.

According to other features of the transmission device according to the invention:
- the fixed support comprises a support element slider extending along the main direction, at least the second retaining element being mounted so as to be translationally movable on said slider;
- the fixed support comprises a transmission element slider extending along the main direction, the transmission element being mounted so as to be translationally mobile on said slider;
- the transmission element slider comprises two abutments, the transmission element being translationally movable between said abutments;
- the transmission element slider coincides with the retaining element slider;
- the first retaining element is fixed with respect to the fixed support or is also mounted so as to be translationally movable on the retaining element slider;
- the transmission element is a wireless energy transmitter for wireless charging of an electronic appliance retained on the support;
- the transmission element is an element for transmitting and receiving pieces of information for exchanging pieces of information with an electronic appliance retained on the support;
- the fixed support comprises at least one third fixed retaining element delimiting the receiving space along a direction different from the main direction.

According to another aspect, the invention relates to a piece of equipment for the interior of a vehicle comprising at least one transmission device as described above.

BRIEF DESCRIPTION OF THE DRAWINGS

Other aspects and advantages of the invention will become apparent upon reading the description which follows, given as an example and made with reference to the appended drawing, wherein:

the FIGURE is a schematic front representation of a piece of vehicle interior equipment comprising a wireless transmission device for an electronic appliance and of an electronic appliance able to be placed on the transmission device.

DETAILED DESCRIPTION OF THE ILLUSTRATED EMBODIMENTS

With reference to the FIGURE, a piece of vehicle interior equipment 1 is described, comprising a wireless transmission device 2 for transmitting energy and/or pieces of information to electronic appliances.

The piece of interior equipment 1 is for example a dashboard, a central console, a vehicle interior trim element or an added element attached to on such an interior trim element.

The transmission device 2 comprises a fixed support 4 for receiving an electronic appliance 6.

The electronic appliance 6 is portable. For example it is a mobile terminal, notably of a portable telephone, of a smartphone or of a digital tablet.

The electronic appliance 6 has a front face 6A, provided with a screen 8, a rear face 6B, opposite to the front face 6A, and edges 6C connecting the front face 6A to the rear face 6B. The electronic appliance 6 in a front view exhibits a substantially rectangular contour and is of a general substantially parallelepipedal shape.

The appliance 6 for example comprises a battery 10, for storing electric energy and a receiving inductive coupling coil 12, the battery 10 being connected to the receiving coil 12 for wireless charging of the battery via the receiving coil.

In addition to or as an alternative to the receiving coil 12, the appliance 6 comprises another type of transmission element 14, for example an RFID chip, a near field communication label or "NFC tag", or other. Thus, as example, the electronic appliance 6 may be provided with a battery 10 which may be charged with a wired charger and with a transmission element 14 of the NFC tag type able to communicate with an additional wireless transmission element or be provided with a battery 10 which may be charged by means of a receiving coil 12 and of another transmission element 14, of the NFC tag or other type. In the continuation of the description and for simplifying understanding of the invention, it will simply be considered that the electronic appliance 6 comprises one transmission element 14.

The transmission element 14 substantially extends to the center of the electronic appliance 6 at least along one of its dimensions, for example along its width 1 defined by its two edges 6C extending along the height of the electronic appliance 6.

The transmission element 2 comprises a complementary transmission element 16 of the transmission element 14 of the electronic appliance 6. The complementary transmission element 16 is borne by the fixed support 4 and is able to be coupled with the transmission element 14 of the electronic appliance 6 when the latter is received by the fixed support 4. This transmission element 16 is for example a coil emitting energy by inductive coupling for transferring electric energy from the energy-emitting coil to the receiving coil 12 by inductive coupling between the coils and/or a near field communication element for exchanging information with the transmission element 14.

The fixed support 4 defines a space 18 for receiving the electronic appliance 6 extending along a main direction $D_1$ and along a secondary direction $D_2$ substantially perpendicular to each other so as to define a plane in which extends the receiving space 18. The receiving space 18 is of a substantially rectangular shape when seen from the front, as illustrated in the FIGURE.

Along the main direction $D_1$, the receiving space 18 is delimited by a first retaining element 20 and by a second retaining element 22. Both of these retaining elements 20 and 22 substantially extend along the secondary direction $D_2$ and are able to retain the electronic appliance 6 by two of its edges 6C on the fixed support 4, for example its edges 6C extending along the height of the electronic appliance as illustrated in the FIGURE. That is to say, according to this example, that the main direction $D_1$ extends along the width 1 of the electronic appliance 6 and that the secondary direction $D_2$ extends along the height of the electronic appliance when the latter is received by the fixed support 4. According to the embodiment illustrated in the FIGURE, the receiving space 18 may also be delimited along the secondary direction $D_2$ by at least one third retaining element 24 extending along the main direction $D_1$ and able to retain the electronic appliance for example by its lower edge.

In order that the fixed support 4 should be able to receive electronic appliances 6 of different dimensions, at least the second retaining element 22 is movable along the main direction D1 with respect to the fixed support 4 in order to allow variation of the distance separating the second retaining element 22 from the first retaining element 20.

To do this, the second retaining element 22 is for example mounted so as to be translationally movable on a retaining element slider 26, extending along the main direction $D_1$. Thus, the distance separating both retaining elements 20 and 22 may be adjusted in order to adapt it to the width 1 of the electronic appliance 6 received by the transmission device 2. The retaining element slider 26 and the retaining element 22 may be provided with mutual locking means (not shown) giving the possibility of blocking the movement of the retaining element 22 with respect to the retaining element slider 26 when the position of the retaining element 22 is satisfactory. Alternatively or additionally, a return means (not shown) may be provided between the first retaining element 20 and the second retaining element 22 so as to allow pressing the second retaining element against one of the edges 6C of the electronic appliance 6 when the latter is placed between both retaining elements. Thus, a user moves the second retaining element 22 away from the first retaining element 20 so as to be able to place the electronic appliance between these retaining elements, and then releases the second retaining element 22 so that the return means brings back the second retaining element 22 towards the first retaining element 20 and thereby ensures blocking of the electronic appliance between both retaining elements.

According to the embodiment illustrated in the FIGURE, the first retaining element 20 is fixed with respect to the fixed support and only the second retaining element 22 is displaceable with respect to this fixed support 4. However, the first retaining element 20 may also be translationally movable along the main direction D1, for example by being itself also mounted on the retaining element slider 26. In this case, mutual locking means (not shown) giving the possibility of blocking the movement of the first retaining element 20 with respect to the retaining element slider 26 are also provided.

The third retaining element 24 allows positioning of the electronic appliance 6 on the fixed support 4 along the second direction $D_2$, as illustrated in the FIGURE.

Because the transmission device 2 according to the invention is able of receiving electronic appliances of variable sizes, this implies that the transmission element 14 is not always positioned at the same location relatively to the receiving space 18 of the fixed support 4 from one electronic appliance to another. Now, in order to ensure good transmission of energy and/or information between the transmission device 2 and the electronic appliance 6 received by this transmission device 2, the transmission element 14 of the electronic appliance should be placed as close as possible to each other and preferably, immediately facing the complementary transmission element 16 of the support device 2.

In order to ensure alignment between the transmission element 14 of the electronic appliance and the complementary transmission element 16 whatever the electronic appliance received in the receiving space 18, the transmission element 16 is movable with respect to the fixed support 4 in order to be able to be placed at the center of this receiving space 18 relatively to the main direction $D_1$. Indeed, by centering the transmission element 16 on the receiving space along the main direction, it is ensured that this transmission element 16 will be aligned along a third direction, perpendicular to the main direction $D_1$ and to the secondary direction $D_2$, with the transmission element 14 of the electronic appliance, itself centered in the main direction with respect to the electronic appliance and therefore with respect to the receiving space 18 when the electronic appliance is received in the receiving space 18.

The transmission element 16 is most particularly translationally movable along the main direction $D_1$ relatively to the fixed support 4. To do this, the transmission element 16 is secured to a sliding element 28 mounted so as to be translationally movable on a transmission element slider extending along the main direction $D_1$. According to the embodiment illustrated in the FIGURE, the transmission element slider coincides with the retaining element slider 26 so as limit the number of constitutive parts of the transmission device 2. However, it is understood that the transmission element slider may be a slider distinct from and parallel with the retaining element slider 26.

The transmission device 2 according to the invention is further arranged so that the centering of the transmission element 16 occurs automatically when the second retaining element 22 is moved relatively to the first retaining element 20, so that the positioning of the transmission element 16 does not require any additional intervention from the user except for displacing the second retaining element 22.

For this purpose, the transmission element 16 is attached to the retaining elements by a mechanism comprising a first return element 30 connecting the transmission element 16 to the first retaining element 20 and a second return element 32 connecting the transmission element 16 to the second retaining element 22. Thus, when the second retaining element 22 and/or the first retaining element 20 are moved, this displacement causes displacement of the transmission element 16 along the main direction $D_1$. The stiffness of the first return element 30 is further equal to the stiffness of the second return element 32. Thus, both return elements 30, 32 of the same stiffness ensure automatic placement of the transmission element 16 at half a distance from the first and second retaining elements 20 and 22, i.e. the transmission element 16 extends at an equal distance from the first and second retaining elements 20, 22 along the main direction and is therefore centered with respect to the receiving space 18. The return elements are for example springs, elastics, or any other suitable return element.

The sliding element 28 is mounted on the slider 26 between two abutments 34 allowing limitation of the displacement of the transmission element 16 in both directions along the main direction $D_1$. Such abutments 34 give the possibility of setting the minimum distance which may separate the sliding element 28, and therefore the transmission element 16, from the first retaining element 20 or from the second retaining element. This minimum distance is selected so that the first return element 30 and the second return element 32 retain minimum tension so that the mechanism may always center the transmission element 16 with respect to the receiving space 18.

The operation of the transmission device 2 described above will now be described.

First of all, the user moves the second retaining element 22 away from the first retaining element 20 so as to adapt the distance separating both of these retaining elements to the width 1 of the electronic appliance 6 of the user. When this distance is sufficient, the user places the electronic appliance 6 in the receiving space 18 for example by applying its rear face 6B against the fixed support 4 so that the screen 8 remains visible when the electronic appliance is in the receiving space 18. The user then optionally performs a clasping operation so as to clasp the electronic appliance 6 between both retaining elements 20, 22. As described earlier, this clasping may optionally be performed automatically.

When the electronic appliance 6 is maintained between the retaining elements 20, 22, its transmission element 14 substantially extends to the center of the receiving space 18 along the main direction $D_1$. Also, by means of the return elements 30, 32, the transmission element 16 substantially extends to the center of the receiving space 18 along the main direction $D_1$. Thus, both transmission elements 14 and 16 are aligned and positioned facing each other, which ensures transmission of energy and/or of information between the transmission device 2 and the electronic appliance 6 regardless of the size of the electronic appliance.

The description above was made by considering that the main direction $D_1$ corresponds to the width of the electronic appliance 6. However, it should be noted that the main direction $D_1$ may correspond to the height of the electronic appliance or to its diagonal. In the latter case, the first and second retaining elements 20, 22 are for example adapted for maintaining the electronic appliance 6 by its corners.

The invention claimed is:

1. A wireless transmission device for an electronic appliance, comprising:
   a fixed support for receiving an electronic appliance, said fixed support comprising at least one first retaining element and a second retaining element defining between them a receiving space for the electronic appliance, at least the second retaining element being movable with respect to the fixed support along a main direction so as to allow adaptation of the size of the receiving space to the electronic appliance received by the support, and
   at least one wireless transmission element for transmitting energy and/or information with the electronic appliance, said transmission element being positioned between the first and second retaining elements and being attached to said retaining elements by a mechanism and being movable with respect to the fixed support, wherein the mechanism comprises a first return element connecting the transmission element to the first retaining element and a second return element connecting the transmission element to the second retaining element, the stiffness of the first return element being equal to the stiffness of the second return element so that the transmission element extends at an equal distance from the first retaining element and the second retaining element such that the transmission element is centered between the first and second retaining elements along the main direction in all positions of the second retaining element relative to the first retaining element.

2. The transmission device according to claim 1, wherein the fixed support comprises a support element slider extending along the main direction, at least the second retaining element being mounted so as to be translationally movable on said slider.

3. The transmission device according to claim 2, wherein the first retaining element is fixed with respect to the fixed support or is also mounted so as to be translationally movable on the retaining element slider.

4. The transmission device according to claim 1, wherein the fixed support comprises a transmission element slider extending along the main direction, the transmission element being at mounted so as to be translationally movable on said slider.

5. The transmission device according to claim 4, wherein the transmission element slider comprises two abutments, the transmission element being translationally movable between said abutments.

6. The transmission device according to claim 4, wherein the transmission element slider coincides with the retaining element slider.

7. The transmission device according to claim 1, wherein the transmission element is a wireless energy transmitter for the wireless charging of an electronic appliance retained on the support.

8. The transmission device according to claim 1, wherein the transmission element is an element for transmitting and receiving information for exchanging information with an electronic appliance retained on the support.

9. The transmission device according to claim 1, wherein the fixed support comprises at least one third fixed retaining element delimiting the receiving space along a direction different from the main direction.

10. A piece of equipment for the interior of a vehicle comprising at least one transmission device according to claim 1.

11. The transmission device according to claim 1, wherein the first retaining element is fixed with respect to the fixed support.

12. The transmission device according to claim 1, wherein the fixed support comprises a transmission element slider extending along the main direction, the transmission element being at mounted so as to be translationally movable on said slider in the main direction.

* * * * *